United States Patent [19]

Albertson, deceased et al.

[11] 3,895,701

[45] July 22, 1975

[54] TRANSMISSION SYSTEM

[76] Inventors: Victor N. Albertson, deceased, late of St. Louis Park, Minn.; by Eleanor M. Albertson, Executrix, 4094 Alabama Ave., St. Louis Park, Minn. 55416

[22] Filed: Dec. 10, 1973

[21] Appl. No.: 423,281

[52] U.S. Cl. .................. 192/44; 192/45; 192/48.1; 192/48.92
[51] Int. Cl.² ............. F16D 3/34; F16D 43/00; F16D 21/00; F16D 41/04
[58] Field of Search .......... 192/44, 45, 48.1, 48.92; 74/143

[56] References Cited
UNITED STATES PATENTS

| | | | |
|---|---|---|---|
| 2,299,739 | 10/1942 | Colucci | 192/44 |
| 2,755,899 | 7/1956 | Erickson | 192/45 |
| 3,108,670 | 10/1963 | Habicht | 192/45 X |
| 3,119,480 | 1/1964 | Fuchs | 192/44 |
| 3,243,023 | 3/1966 | Boyden | 192/44 X |
| 3,707,884 | 1/1973 | Go | 192/44 X |

FOREIGN PATENTS OR APPLICATIONS 1,149,949 6/1963 Germany ........................ 192/44

*Primary Examiner*—Samuel Scott
*Assistant Examiner*—Lance W. Chandler
*Attorney, Agent, or Firm*—Alfred E. Hall

[57] ABSTRACT

A transmission system for converting an oscillatory linear motion to intermittent rotational motion which includes a driving shaft adapted to be rotated selectively in either a clockwise or a counter-clockwise direction through a first friction type clutch. Affixed to this driving shaft and rotatable therewith is a torque applying member which is arranged to cooperate with a second friction type clutch secured to the output shaft. The arrangement is such that the output shaft is positively locked and unable to rotate except when a torque is applied by the torque applying member under control of the first friction type clutch.

7 Claims, 1 Drawing Figure

PATENTED JUL 22 1975 3,895,701
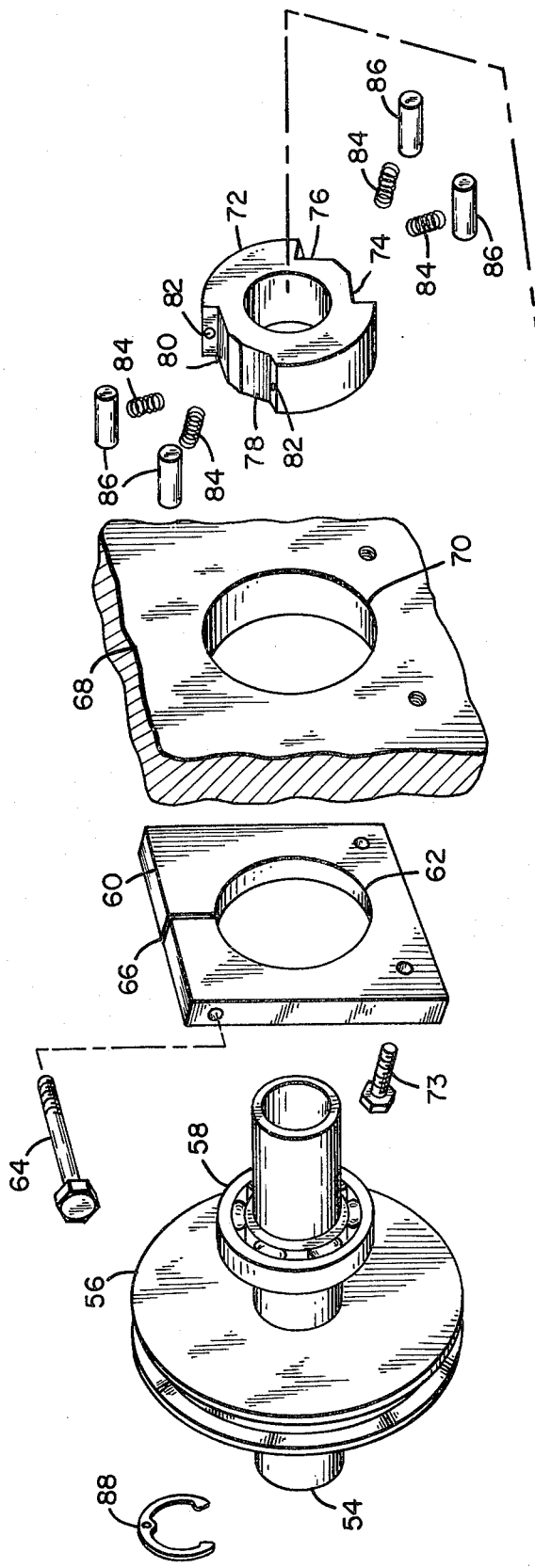
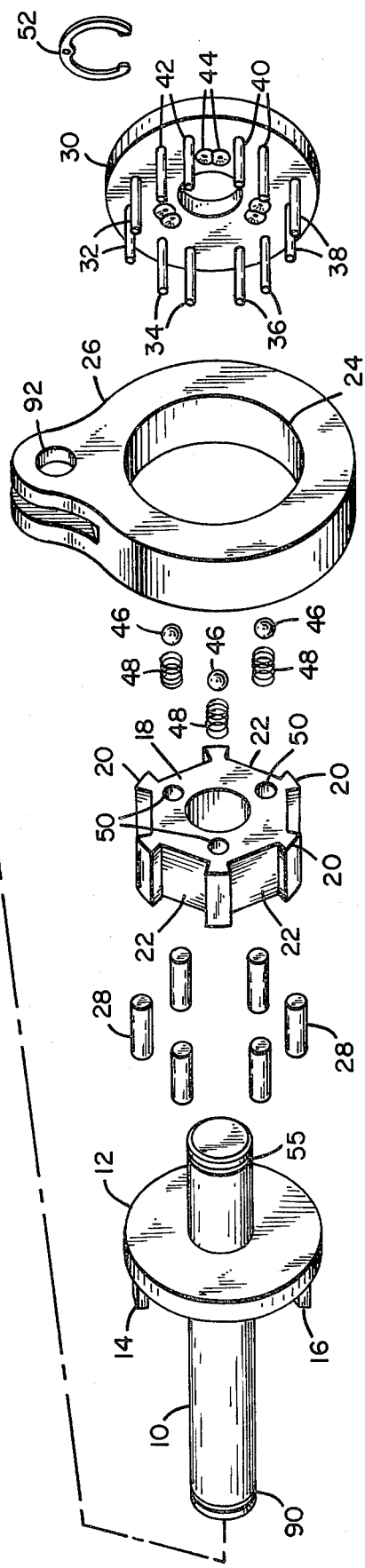

TRANSMISSION SYSTEM

BACKGROUND OF THE INVENTION

This invention relates generally to a vehicle drive system and more particularly to a novel transmission system in which an output shaft can be made to rotate selectively in either direction in response to an oscillatory input force but which is prevented from rotating at all in the absence of this input force.

In some vehicles, such as snowmobiles or so-called "all terrain vehicles," it is desirable for safety reasons that the vehicle be prevented from moving in the absence of applied power. For example, if the vehicle should be operating on a steep hill at the time that the engine stalls, it is desirable that means be provided for preventing the vehicle from moving under the force of gravity. Although vehicles of this type are generally equipped with a braking system, it has been found to be desirable that the transmission connecting the engine to the wheels or track be such that when the engine fails the output shaft, i.e., the driven member which supplies rotational power to the wheels, be firmly locked to thereby prevent the vehicle from moving.

The transmission of the present invention provides such selflocking or braking action in the event of power failure. In addition, it is simple in design and avoids the use of complex and costly gear trains or fluid coupling arrangements.

These advantages are accomplished in the present invention by providing first and second friction type clutches, one associated with the input or driving shaft and the other with the output or driven shaft. Each of these clutches is generally of the type disclosed in the Applebaum Pat. No. 1,413,563 in that they involve the use of rollers disposed in a wedging relation between polygonal shaped discs which are secured to the shafts to be driven and a surrounding collar. However, the overall combination making up the present invention is substantially different in construction and in its mode of operation from that described in the Applebaum patent. Specifically, the first friction type clutch couples an oscillatory type motive power source to the input shaft so as to impart intermittent rotational motion thereto in either the clockwise or the counter-clockwise direction, depending upon the setting of a control member which governs the relative positioning of the rollers employed in the friction clutch. When this input shaft is rotated, it applies a torque in one direction or the other to opposed pairs of rollers in the second friction type clutch to thereby release a set of rollers in the opposed pairs from their wedging relationship and permit rotation of the output shaft in a given direction. When no torque is applied, the rollers of the second friction type clutch are wedged between the frame and the output shaft to lock it firmly against rotation.

It is accordingly an object of the present invention to provide a new and improved transmission for coupling an oscillatory type drive motor to an output shaft.

Another object of the invention is to provide a transmission adapted to transfer rotational motion from an input shaft to an output shaft only when a torque is applied to the input shaft.

Still another object of the invention is to provide a novel transmission system in which the output shaft is positively locked and prevented from rotating in the event that no torque is applied to the input shaft.

Yet another object of the invention is to provide a transmission system utilizing first and second friction type clutches for respectively connecting a drive source to an input shaft and the input shaft to the output shaft in such a fashion that the output shaft is able to rotate only when torque is available from the drive source.

These and other objects of the invention will become readily apparent when the preferred embodiment is explained in detail with the aid of the accompanying drawing in which there is shown by means of an exploded perspective view the details of construction of the preferred embodiment.

DESCRIPTION OF THE PREFERRED EMBODIMENT

Referring now to the FIGURE, there is shown an input shaft 10 which is generally cylindrical in shape and which has affixed to it a torque applying member in the form of a plate or disc 12 which is keyed to shaft 10 and therefore rotatable with it. Projecting from the rear face of the plate 12 are first and second rectangularly shaped lugs 14 and 16.

Also keyed to the input shaft 10 is a polygonal shaped disc member 18 and when affixed to the shaft 10 abuts the front face of the torque applying member 12. The polygonal shaped disc member 18 has a plurality of integrally formed projections 20 radially extending from the vertices thereof to thereby define a plurality of notches 22 there between. As can be seen from the FIGURE, these radially extending projections 20 have a generally circular profile at their periphery so as to conform with the circular opening 24 of a driving collar 26. That is, when the parts are assembled on the shaft 10, the polygonal shaped disc member 18 with its projections 20 fits within the opening 24 in a sliding relationship. That is, the diameter of the opening 24 is slightly greater than the diameter of the circular profile defined by the projections 20 extending from disc member 18.

Before the collar member 26 is positioned about the member 18, a roller 28 is inserted in each of the notches 22 between adjacent projections 20.

Once the collar 26 and the rollers 28 are disposed in their proper relationship described above on the shaft 10, an end plate 30 is slipped onto the shaft. The end plate 30 has a plurality of pairs of projecting fingers 32, 34, 36, 38, 40 and 42. The number of pairs of fingers employed on the end plate 30 is equal to the number of sides on the polygonal shaped disc member 18. When positioned on the shaft, a pair of fingers 32, 34, etc., are located in each of the notches 22 such that the associated roller 28 is disposed between the pair of fingers. Thus, when the end plate 30 is rotated in either the clockwise or the counter-clockwise direction, the roller members 28 in each of the notches 22 is moved either clockwise or counter-clockwise.

The end plate 30 is also provided with a plurality of pairs of indentations such as 44. These indentations are spherical in shape and are adapted to receive the balls 46 which are urged against the end plate 30 by the compression type springs 48. The springs 48, in turn, are adpated to fit into the cylindrical recesses 50 formed in the front face of the polygonal shaped disc member 18. The combination of the springs 48, the balls 46 and the recesses 44 form a detent which serves to hold the end plate 30 in either of two positions in which it may be placed.

A C-ring 52 in adapted to fit into a notch 55 formed on the end of the input shaft 10 and when so positioned, holds the end plate 30 and the collar 26 in position.

Referring to the upper portion of the FIGURE there is shown an output shaft 54 to which is attached a driving pulley 56 or some other suitable power take-off device such as a sprocket wheel or the like. Also secured to the shaft 54 is a roller bearing assembly 58 which allows the shaft 54 to be journaled in a clamping plate 60 so as to be concentric with the opening 62 therein and rotatably mounted with respect thereto. The bolt 64 is used to draw up the separation 66 in the clamping member 60 to securely hold the bearing assembly 58 in place.

The clamping assembly 60 may then be bolted or otherwise secured to the frame of the vehicle here represented by the plate 68 which also has a circular aperture 70 formed therein. When the clamping plate assembly 60 is secured to the frame 68 by the bolt 73 the shaft 54 will be free to rotate therein with a portion of the output shaft 54 extending there through.

As is shown in the FIGURE, the shaft 54 is a generally tubular member with the inside diameter of the tube slightly larger than the outside diameter of the input shaft 10. As such, the shaft 10 fits within the output shaft 54 in a telescoping fashion.

Secured to the output shaft 54 by press fitting or keying is a clutch plate 72. Clutch plate 72 has a generally circular profile but on diametrically opposed locations there are provided first and second pairs of V-shaped notches. The notches 74 and 76 comprise the first pair and notches 78 and 80 form the second pair. Located in the flat surface of each of the notches is a cylindrical opening 82 which is adapted to at least partially receive the compression springs 84. These springs 84 are used to resiliently urge the rollers 86 outwardly from these notches and against the wall of the aperture 70 in the frame plate 68. That is, the clutch plate 72 has an outside diameter which is slightly less than the diameter of the aperture 70 in the plate 68 so that it is free to rotate within the aperture 70 so long as the rollers 86 which reside in the notches 74 – 80 do not wedge or bind between the notches and the wall of the aperture 70.

When the input shaft 10 is inserted into the tubular output shaft 54 the projecting lugs 14 and 16 are disposed between the respective pairs of V-shaped notches and cooperate with the rollers 86 thereof in a manner which will be described more fully hereinbelow.

The entire apparatus is maintained in its assembled condition by means of a C-ring 88 which cooperates with the notch 90 formed in the end of the input shaft 10. That is, the shaft 10 cannot be removed from its telescoped relationship with respect to output shaft 54 until the C-ring 88 is removed.

Now that the details of the construction of the transmission of this invention have been described in detail, consideration will next be given to the mode of operation.

OPERATION

Referring to the FIGURE, and imagining that it is in its assembled condition rather than in the exploded condition illustrated, the fingers 32 – 42 will be disposed on opposite sides of the individual rollers 28 which are contained within the notches 22 of the polygonal shaped disc member 18. When the end plate 30 is rotated in the clockwise direction, the rollers 28 will also be rotated in a clockwise direction and will be wedged between the wall of the aperture 24 in the collar 26 when the collar 26 is moved in the clockwise direction by means of an oscillating drive source (not shown) which is adapted to be coupled to the lug 92 on the collar 26. Thus, the polygonal shaped plate 18 will be rotated in the clockwise direction and since it is keyed to the input shaft 10, the shaft 10 will also be rotated. On the return stroke of the oscillating drive source when the collar 26 is moved in the counter-clockwise direction, the rollers 28 will no longer be effective to wedge the disc member 18 against the wall of the aperture 24 and the collar 26 will therefore slip freely over the rollers and will not produce a counter-clockwise rotation of the output shaft. On the next clockwise stroke, however, the rollers 28 will again be wedged between the surface of the notch 22 and the wall of the aperture of collar 24 to produce a clockwise rotation of the shaft 10.

When it is desired to cause the shaft 10 to rotate in a counter-clockwise direction, the end plate 30 is rotated in the counter-clockwise direction such that the fingers 32 through 42 relocate the axes of the rollers 28 in a counter-clockwise direction, the end plate 30 being held in its set position by the ball type detent comprising recesses 44, balls 46 and springs 48. Now, when the drive source produces a counter-clockwise oscillation of the collar 26 the rollers 28 will be wedged against the flat surface of the notches 22 and the wall of the aperture 24 on the counter-clockwise stroke and will force the polygonal shaped disc member 18 to rotate in the counter-clockwise direction thereby carrying the shaft 10 along with it. On the clockwise stroke of the oscillating input source, the collar 26 will slip freely over the rollers 28 and the circular periphery of the notches 20 on the member 18 and hence no rotation will be imparted to the output shaft 10.

Thus, it has been shown the manner in which an operator can selectively cause the input shaft 10 to rotate either in the clockwise or counter-clockwise direction. Next, attention will be given to the manner in which the self-locking feature of this invention is accomplished.

Assuming that the input shaft 10 is made to rotate in its clockwise direction because of the particular setting of the end plate 30 and its associated fingers, the plate member 12 will also rotate in the clockwise direction because it is fixedly attached to the shaft 10. The fingers 14 and 16 projecting from the rear face of the plate 12 will act upon the rollers 86 located in opposed notches 80 and 74 to move them out of their normal wedging relationship between the notches and the wall of the aperture 70 in the frame member 68 and the fingers 14 and 16 will rotate the clutch plate 72 in a clockwise direction so long as a torque in the clockwise direction is applied to the clutch plate 72. This, of course, causes the output shaft 54 to rotate in the clockwise direction within its journal bearing 58. When no torque is applied to the rollers 86 by the fingers 14 and 16 which occurs in the event of engine failure or on the counter-clockwise return stroke of the drive source, the springs 84 will again urge the rollers 86 into locking or wedging relationship between the walls of the frame member 68 and the flat surfaces of the V-shaped notches formed in the clutch plate 72 thus preventing relative rotation of the plate 72 in the aperture 70.

When the end plate member 30 is moved to its alternate position to produce a counter-clockwise rotation of the input shaft, the fingers 14 and 16 of the plate 12 will not cooperate with the rollers 86 located in the V-shaped notches 76 and 78 to move these rollers out of locking engagement and preventing a counter-clockwise rotation of the clutch plate 72. Again, the rollers which are located in notches 74 and 82 will serve to prevent any clockwise rotation of the shaft so long as the torque applied to the plate member 12 is in the counter-clockwise direction.

The constructive design of the various parts may be modified in various ways within the scope of the present invention and the application of this invention is not restricted to any particular machines, but as already stated, it is applicable to all cases where it is necessary to convert oscillatory movement into unidirectional rotating movement yet providing a positive locking of the output shaft to the frame in the event of a loss of motive power. Hence, the scope of the invention is to be determined from the appended claims.

What is claimed is:

1. Transmission apparatus mounted on a support structure and adapted to couple an oscillatory drive member to an output shaft for imparting intermittent rotational motion to said shaft comprising:
   a. a mounting plate attached to said support structure and having a circular aperture formed therein of a predetermined diameter;
   b. a tubular output shaft;
   c. means for rotationally mounting said output shaft in the aperture in said mounting plate;
   d. a clutch plate attached to said tubular output shaft and having a generally circular profile of a diameter slightly less than the diameter of said aperture in said mounting plate so as to be insertable therein and having first and second pairs of V-shaped notches diametrically apposed from one another cut in the periphery thereof, the notches in a pair being separated by a region of reduced clutch plate radius;
   e. first and second pairs of rollers individually disposed in said V-shaped notches and each normally resiliently wedged between a wall of said V-shaped notch and the wall defined by the aperture in said mounting plate;
   f. a driving shaft of a diameter slightly less than the inside diameter of said tubular output shaft so as to be slidably insertable therein in telescoping arrangement;
   g. means secured to said driving shaft including projecting tabs movably inserted respectively into the regions of reduced clutch plate radius for moving one of the adjacent rollers out of engagement with the wall of the aperture in said mounting plate only when a torque is applied thereto;
   h. coupling means attached to said driving shaft adapted to be connected to a source of oscillating motive power; and
   i. directional control means operatively cooperating with said coupling means for causing said driving shaft to rotate in a clockwise or counter-clockwise direction depending on the setting of said directional control means.

2. The transmission as in claim 1 wherein said means secured to said driving shaft comprises a plate member having first and second fingers projecting from one face thereof, said first and second fingers passing between the V-shaped notches in said first and second pairs into the regions of reduced clutch plate radius.

3. Apparatus as in claim 1 wherein said coupling means includes:
   a. a polygonal shaped disc member secured to said driving shaft having a plurality of projections radially extending from the verticies thereof;
   b. a plurality of rollers equal in number to the number of sides on said polygonal shaped disc member;
   c. a collar adapted to surround said polygonal shaped disc member and retain said rollers between said projections; and
   d. means connecting said collar to a source of oscillating motive power.

4. Apparatus as in claim 3 wherein said directional control means includes:
   a. a plurality of pairs of fingers equal in number to the number of sides on said polygonal shaped disc member, one finger being disposed on each side of said rollers; and
   b. means for moving said fingers in unison to thereby urge said rollers in wedging relationship between said collar and said polygonal shaped disc member.

5. Apparatus as in claim 4 and further including detent means for said directional control means for maintaining said directional control means in a first or a second position.

6. Apparatus as in claim 5 wherein said detent means comprises at least one sphere resiliently urged against either a first or second recess in said means for moving said fingers in unison.

7. Transmission apparatus adapted to couple an oscillatory drive member to an output shaft for imparting intermittent rotational motion to said shaft comprising:
   a. a mounting plate having a circular aperture formed therein of a diameter $D_1$;
   b. a tubular output shaft;
   c. bearing means secured to said tubular output shaft and connected to said mounting plate such that said output shaft is rotationally mounted concentric with the aperture in said mounting plate;
   d. a clutch plate keyed to said tubular output shaft, said clutch plate being a substantially circular disc of a diameter $D_2$ which is slightly less than diameter $D_1$ of said aperture in said mounting plate and having first and second pairs of V-shaped notches diametrically opposed from one another formed in the periphery of said clutch plate;
   e. first and second pairs of cylindrical rollers disposed in said first and second pairs of V-shaped notches;
   f. means for normally resiliently wedging said first and second pairs of rollers between said V-shaped notches and the wall of said aperture in said mounting plate;
   g. a solid driving shaft of a diameter slightly less than the inside diameter of said tubular output shaft so as to be slidably insertable therein in telescoping arrangement;
   h. a plate having first and second fingers projecting therefrom from one face thereof keyed to said driving shaft, said first and second fingers passing between the V-shaped notches in said first and second pairs to thereby cooperate with opposed pairs of said rollers;
   i. a polygonal shaped disc member keyed to said driving shaft and having a plurality of projections radially extending from the verticies thereof, said projections having a circular profile at the periphery thereof;

i. a plurality of rollers, corresponding to the number of sides on said polygonal shaped disc member;

k. a driving collar having an aperture therein of a diameter defined by the projections on said polygonal shaped disc member adapted to fit around said profile and retain said rollers between said projections on said polygonal shaped disc member;

l. an end plate rotatably mounted on said driving shaft and having a plurality of pairs of fingers extending from one surface thereof each pair inserted between adjacent projections on said polygonal shaped disc member on either side of said rollers; and m. means coupling an oscillating drive member to said collar for repetitively rotating said collar back and forth through a predetermined arc.

* * * * *